US011626761B2

(12) United States Patent
Zeine et al.

(10) Patent No.: US 11,626,761 B2
(45) Date of Patent: Apr. 11, 2023

(54) WIRELESS POWER RECEIVER CLIENTS WITH DYNAMICALLY RECONFIGURABLE ANTENNA CONFIGURATIONS

(71) Applicant: Ossia Inc., Bellevue, WA (US)

(72) Inventors: Hatem Ibrahim Zeine, Bellevue, WA (US); Alireza Pourghorban Saghati, Los Gatos, CA (US)

(73) Assignee: Ossia Inc., Redmond, WA (US)

( * ) Notice: Subject to any disclaimer, the term of this patent is extended or adjusted under 35 U.S.C. 154(b) by 319 days.

(21) Appl. No.: 17/019,887

(22) Filed: Sep. 14, 2020

(65) Prior Publication Data

US 2021/0104918 A1  Apr. 8, 2021

Related U.S. Application Data

(63) Continuation of application No. 15/599,029, filed on May 18, 2017, now Pat. No. 10,778,042.

(60) Provisional application No. 62/338,086, filed on May 18, 2016.

(51) Int. Cl.
*H02J 50/20* (2016.01)
*H02J 50/80* (2016.01)
*H02J 7/00* (2006.01)

(52) U.S. Cl.
CPC .............. *H02J 50/20* (2016.02); *H02J 7/007* (2013.01); *H02J 50/80* (2016.02)

(58) Field of Classification Search
None
See application file for complete search history.

(56) References Cited

U.S. PATENT DOCUMENTS

| | | | |
|---|---|---|---|
| 2012/0228954 A1 | 9/2012 | Kesler et al. | |
| 2016/0099758 A1* | 4/2016 | Bell | H04W 12/08 307/104 |
| 2016/0118805 A1 | 4/2016 | Swope et al. | |
| 2016/0118834 A1 | 4/2016 | Swope et al. | |
| 2016/0197552 A1 | 7/2016 | Giuliano | |
| 2017/0057370 A1* | 3/2017 | Harper | H04B 1/3827 |

* cited by examiner

*Primary Examiner* — Jared Fureman
*Assistant Examiner* — Aqeel H Bukhari

(57) ABSTRACT

The technology described herein relates to wireless power receivers with reconfigurable (or adaptive) antenna configurations for improved wireless power transfer in multipath wireless power delivery environments. In an implementation, a wireless power receiver is described. The wireless power receiver includes one or more radio frequency (RF) antennas, power metering circuitry and control circuitry. The power metering circuitry is adapted to measure at least one characteristic of wireless power received from a wireless power transmission system in a multipath environment. The control circuitry is adapted to monitor the power metering circuitry to determine when the measure of the at least one characteristic of the wireless power fails to meet a preset threshold, and dynamically reconfigure an antenna configuration of the wireless power receiver when the at least one characteristic of the wireless power fails to meet the preset threshold.

20 Claims, 13 Drawing Sheets

WIRELESS POWER RECEIVER CLIENTS WITH DYNAMICALLY RECONFIGURABLE ANTENNA CONFIGURATIONS

CROSS-REFERENCE TO RELATED APPLICATIONS

This application is a continuation of U.S. patent application Ser. No. 15/599,029, filed May 18, 2017, and issued as U.S. Pat. No. 10,778,042 on Sep. 15, 2020; which claims priority to U.S. Provisional Patent Application No. 62/338,086, filed May 18, 2016, each of which is hereby incorporated by reference in its entirety.

TECHNICAL FIELD

The technology described herein relates generally to the field of wireless power transmission and, more specifically, to wireless power receivers with reconfigurable antenna configurations for improved wireless power transfer in multipath wireless power delivery environments.

BACKGROUND

Many electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It is, therefore, desirable to derive power for electronics wirelessly.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

SUMMARY

Examples discussed herein relate to wireless power receivers with reconfigurable (or adaptive) antenna configurations for improved wireless power transfer in multipath wireless power delivery environments. In an implementation, a wireless power receiver apparatus is described. The wireless power receiver apparatus includes one or more radio frequency (RF) antennas, power metering circuitry and control circuitry. The power metering circuitry is adapted to measure at least one characteristic of wireless power received from a wireless power transmission system in a multipath environment. The control circuitry is adapted to monitor the power metering circuitry to determine when the measure of the at least one characteristic of the wireless power fails to meet a preset threshold, and dynamically reconfigure an antenna configuration of the wireless power receiver when the at least one characteristic of the wireless power fails to meet the preset threshold.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
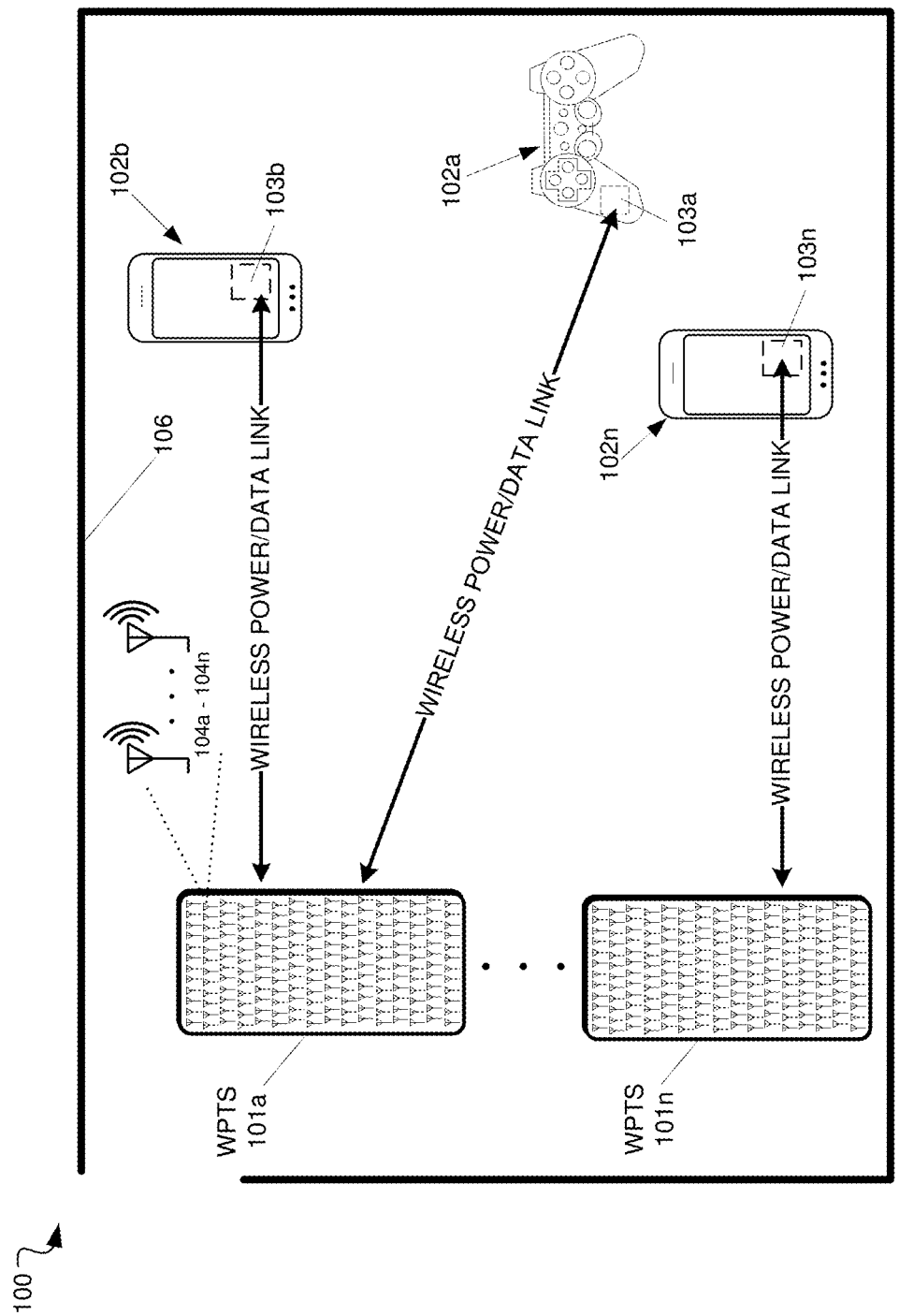
FIG. 1 depicts a block diagram including an example wireless power delivery environment illustrating wireless power delivery from one or more wireless power transmission systems to various wireless devices within the wireless power delivery environment in accordance with some embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Any headings provided herein are for convenience only and do not necessarily affect the scope or meaning of the claimed invention.

I. Wireless Power Transmission System Overview/Architecture

FIG. 1 depicts a block diagram including an example wireless power delivery environment 100 illustrating wireless power delivery from one or more wireless power transmission systems (WPTS) 101a-n (also referred to as "wireless power delivery systems", "antenna array systems" and "wireless chargers") to various wireless devices 102a-n within the wireless power delivery environment 100, according to some embodiments. More specifically, FIG. 1 illustrates an example wireless power delivery environment 100 in which wireless power and/or data can be delivered to available wireless devices 102a-102n having one or more wireless power receiver clients 103a-103n (also referred to herein as "clients" and "wireless power receivers"). The wireless power receiver clients are configured to receive and process wireless power from one or more wireless power transmission systems 101a-101n. Components of an example wireless power receiver client 103 are shown and discussed in greater detail with reference to FIG. 4.

As shown in the example of FIG. 1, the wireless devices 102a-102n include mobile phone devices and a wireless game controller. However, the wireless devices 102a-102n can be any device or system that needs power and is capable of receiving wireless power via one or more integrated wireless power receiver clients 103a-103n. As discussed herein, the one or more integrated wireless power receiver clients receive and process power from one or more wireless power transmission systems 101a-101n and provide the power to the wireless devices 102a-102n (or internal batteries of the wireless devices) for operation thereof.

Each wireless power transmission system 101 can include multiple antennas 104a-n, e.g., an antenna array including hundreds or thousands of antennas, which are capable of delivering wireless power to wireless devices 102a-102n. In some embodiments, the antennas are adaptively-phased RF antennas. The wireless power transmission system 101 is capable of determining the appropriate phases with which to deliver a coherent power transmission signal to the wireless power receiver clients 103a-103n. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more wireless power receiver clients 103. As illustrated in the example of FIG. 1, power delivery antennas 104a-104n are shown. The power delivery antennas 104a are configured to provide delivery of wireless radio frequency power in the wireless power delivery environment. In some embodiments, one or more of the power delivery antennas 104a-104n can alternatively or additionally be configured for data communications in addition to or in lieu of wireless power delivery. The one or more data communication antennas are configured to send data communications to and receive data communications from the wireless power receiver clients 103a-103n and/or the wireless devices 102a-102n. In some embodiments, the data communication antennas can communicate via Bluetooth™, Wi-Fi™, ZigBee™, etc. Other data communication protocols are also possible.

Each wireless power receiver client 103a-103n includes one or more antennas (not shown) for receiving signals from the wireless power transmission systems 101a-101n. Likewise, each wireless power transmission system 101a-101n includes an antenna array having one or more antennas and/or sets of antennas capable of emitting continuous wave or discrete (pulse) signals at specific phases relative to each other. As discussed above, each of the wireless power transmission systems 101a-101n is capable of determining the appropriate phases for delivering the coherent signals to the wireless power receiver clients 102a-102n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101a-101n can be connected to a power source such as, for example, a power outlet or source connecting the wireless power transmission systems to a standard or primary AC power supply in a building. Alternatively, or additionally, one or more of the wireless power transmission systems 101a-101n can be powered by a battery or via other mechanisms, e.g., solar cells, etc.

The wireless power receiver clients 102a-102n and/or wireless power transmission systems 101a-101n are configured to operate in a multipath wireless power delivery environment. That is, the wireless power receiver clients 102a-102n and the wireless power transmission systems 101a-101n are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the wireless power receiver clients 103a-103n.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the wireless power receiver clients 103a-103n can each include a data communication module for communication via a data channel. Alternatively, or additionally, the wireless power receiver clients 103a-103n can direct the wireless devices 102a-102n to communicate with the wireless power transmission system via existing data communications modules. In some embodiments, the beacon signal, which is primarily referred to herein as a continuous waveform, can alternatively or additionally take the form of a modulated signal.

Figure 2:
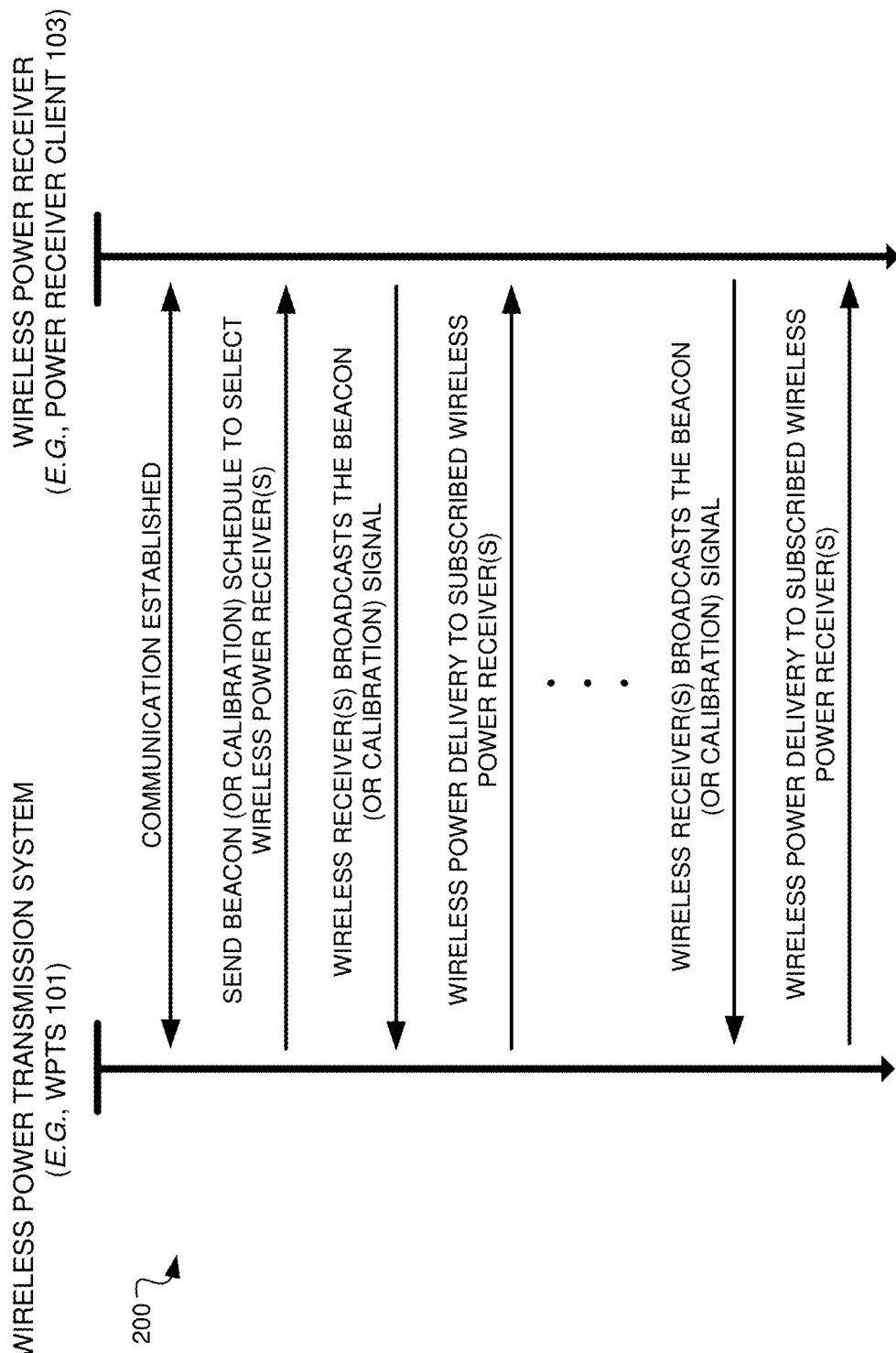
FIG. 2 depicts a sequence diagram illustrating example operations between a wireless power transmission system and a wireless receiver client for commencing wireless power delivery in accordance with some embodiments.

FIG. 2 depicts a sequence diagram 200 illustrating example operations between a wireless power delivery system (e.g., WPTS 101) and a wireless power receiver client (e.g., wireless power receiver client 103) for establishing wireless power delivery in a multipath wireless power delivery environment, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select wireless power receiver clients 103. The wireless power transmission system 101 can also send power transmission scheduling information so that the wireless power receiver client 103 knows when to expect (e.g., a window of time) wireless power from the wireless power transmission system. The wireless power receiver client 103 then generates a beacon (or calibration) signal and broadcasts the beacon during an assigned beacon transmission window (or time slice) indicated by the beacon schedule information, e.g., BBS cycle. As discussed herein, the wireless power receiver client 103 includes one or more antennas (or transceivers) which have a radiation and reception pattern in three-dimensional space proximate to the wireless device 102 in which the wireless power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the wireless power receiver client 103 via the same path over which the beacon signal was received from the wireless power receiver client 103.

In some embodiments, the wireless power transmission system 101 includes many antennas. One or more of the many antennas may be used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from the one or more antennas in such a way as to create an aggregate signal from the one or more of the antennas that approximately recreates the waveform of the beacon in the opposite direction. Said another way, the wireless power transmission system 101 can deliver wireless RF power to the wireless power receiver clients via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client 103 at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 3.

Figure 3:
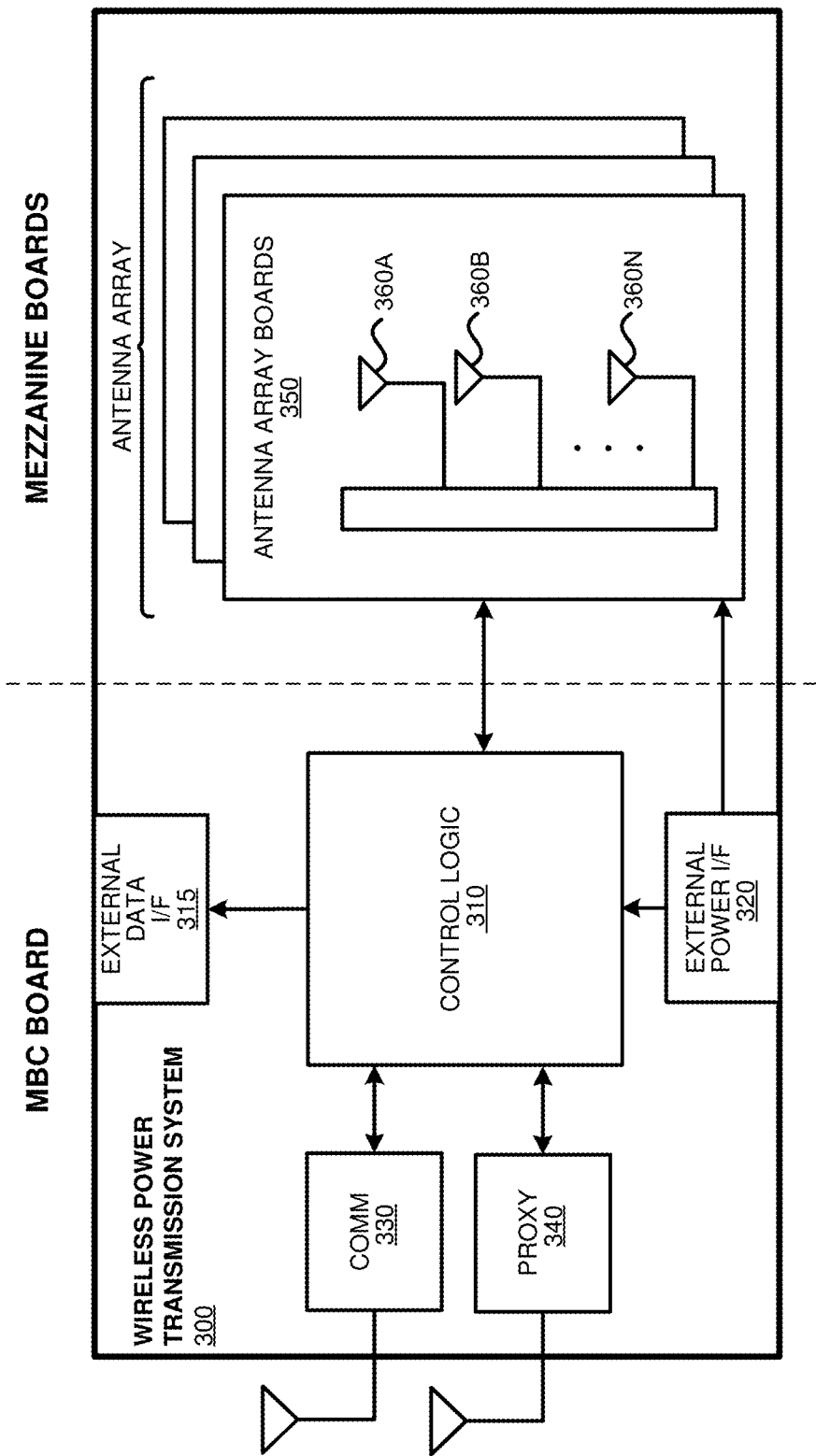
FIG. 3 depicts a block diagram illustrating example components of a wireless power transmission system in accordance with some embodiments.

FIG. 3 depicts a block diagram illustrating example components of a wireless power transmission system 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330 and proxy 340. The mezzanine (or antenna array boards 350) each include multiple antennas 360a-360n. Some or all of the components can be omitted in some embodiments. Additional components are also possible. For example, in some embodiments only one of communication block 330 or proxy 340 may be included.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth™ Wi-Fi™, ZigBee™, etc., including combinations or variations thereof. Likewise, the proxy 340 can communicate with clients via data communications as discussed herein. The data communications can be, by way of example and not limitation, Bluetooth™, Wi-Fi™ ZigBee™, etc. Other communication protocols are possible.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and/or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoTs. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. In other embodiments, the external power interface 320 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, the MBC, which controls the wireless power transmission system 300, receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 4:
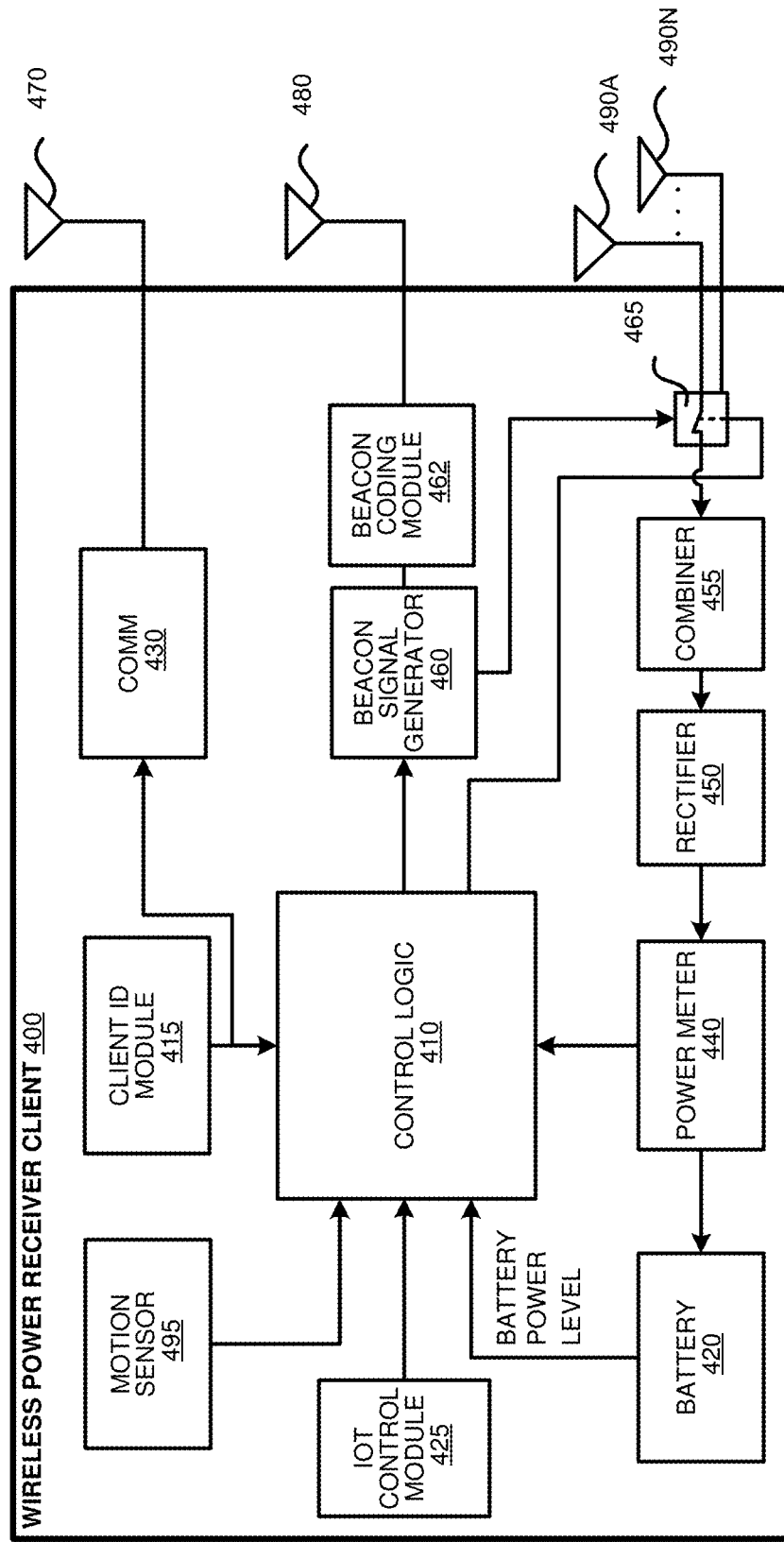
FIG. 4 depicts a block diagram illustrating example components of a wireless power receiver client in accordance with some embodiments.

FIG. 4 is a block diagram illustrating example components of a wireless power receiver client 400, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client 400 does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. In other embodiments, each antenna's power path can have its own rectifier 450 and the DC power out of the rectifiers is combined prior to feeding the power meter 440. The power meter 440 can measure the received power signal strength and provides the control logic 410 with this measurement.

Battery 420 can include protection circuitry and/or monitoring functions. Additionally, the battery 420 can include one or more features, including, but not limited to, current limiting, temperature protection, over/under voltage alerts and protection, and coulomb monitoring.

The control logic 410 receives and processes the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown as charged by, and providing power to, the wireless power receiver client 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client 400 is embedded, usage information of the device in which the wireless power receiver client 400 is embedded, power levels of the battery or batteries of the device in which the wireless power receiver client 400 is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the wireless power receiver client 400 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 495 can detect motion and signal the control logic 410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 5A:
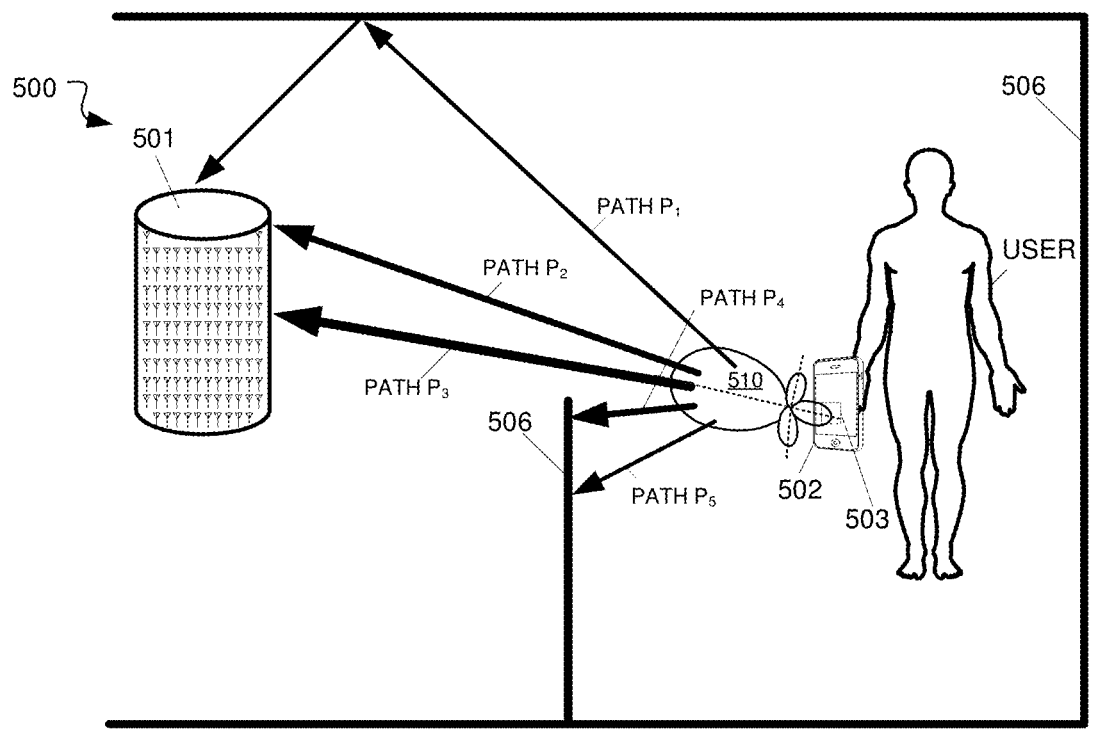
FIGS. 5A and 5B depict diagrams illustrating an example multipath wireless power delivery environment in accordance with some embodiments.
Figure 5B:
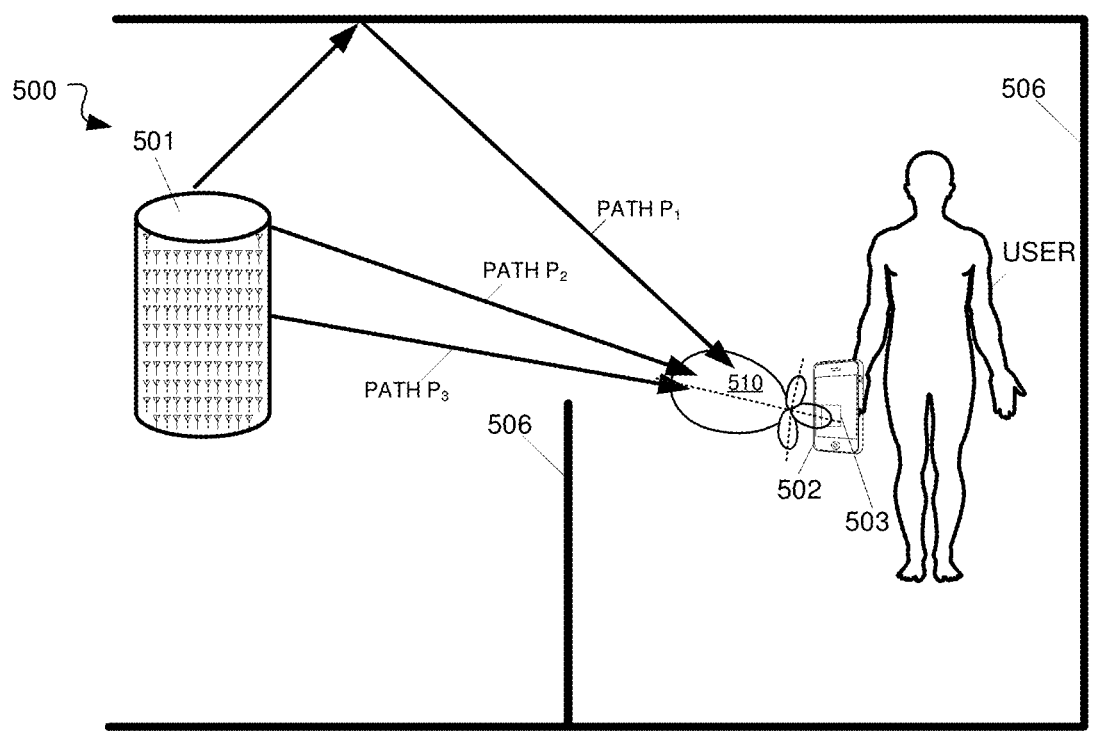

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 102. The one or more antennas (or transceivers) can be wholly or partially included as part of the wireless device 102 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., received signal strength indication (RSSI), depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments, the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive power, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment.

Although the example of FIG. 5A illustrates transmitting a beacon (or calibration) signal in the direction of the radiation and reception pattern 510, it is appreciated that, in some embodiments, beacon signals can alternatively or additionally be omni-directionally transmitted.

II. Reconfigurable Client Antennas

Wireless power receiver clients have radiation and reception patterns in the three-dimensional space proximate to the devices in which they are embedded and/or otherwise associated. Today, most wireless power receiver clients have radiation and reception patterns that are static or fixed relative to the position of the client device in which the wireless power receiver is embedded and/or otherwise associated. This means that the radiation and reception patterns are not always directed for optimal (or maximum available) wireless power transfer. For example, a user might orient the device in a position from which little or no power can be received. To overcome these and other issues, wireless power receiver clients are discussed herein with dynamic reconfigurable antenna configurations.

In some embodiments, a wireless power receiver client (or controller associated therewith) intelligently modifies its configuration, e.g., tilts its radiation pattern, for optimal power transfer. For example, the tilt can be adjusted to cause the radiation power to be directed in the line of sight of the wireless power transmission system (transmitter). Alternatively or additionally, the tilt can be adjusted to cause the radiation pattern to be directed toward reflective material in the multipath environment so that a wireless power transmission system can optimally reach the power receiver client via multipath.

The configurations discussed herein can include one or more of reconfiguring the antenna pattern, the antenna polarization, the gain/beam width and/or the type or kind of one or more antennas of a switchable antenna array. Other configurations including combinations or variations thereof are also possible.

Figures 6, 7:
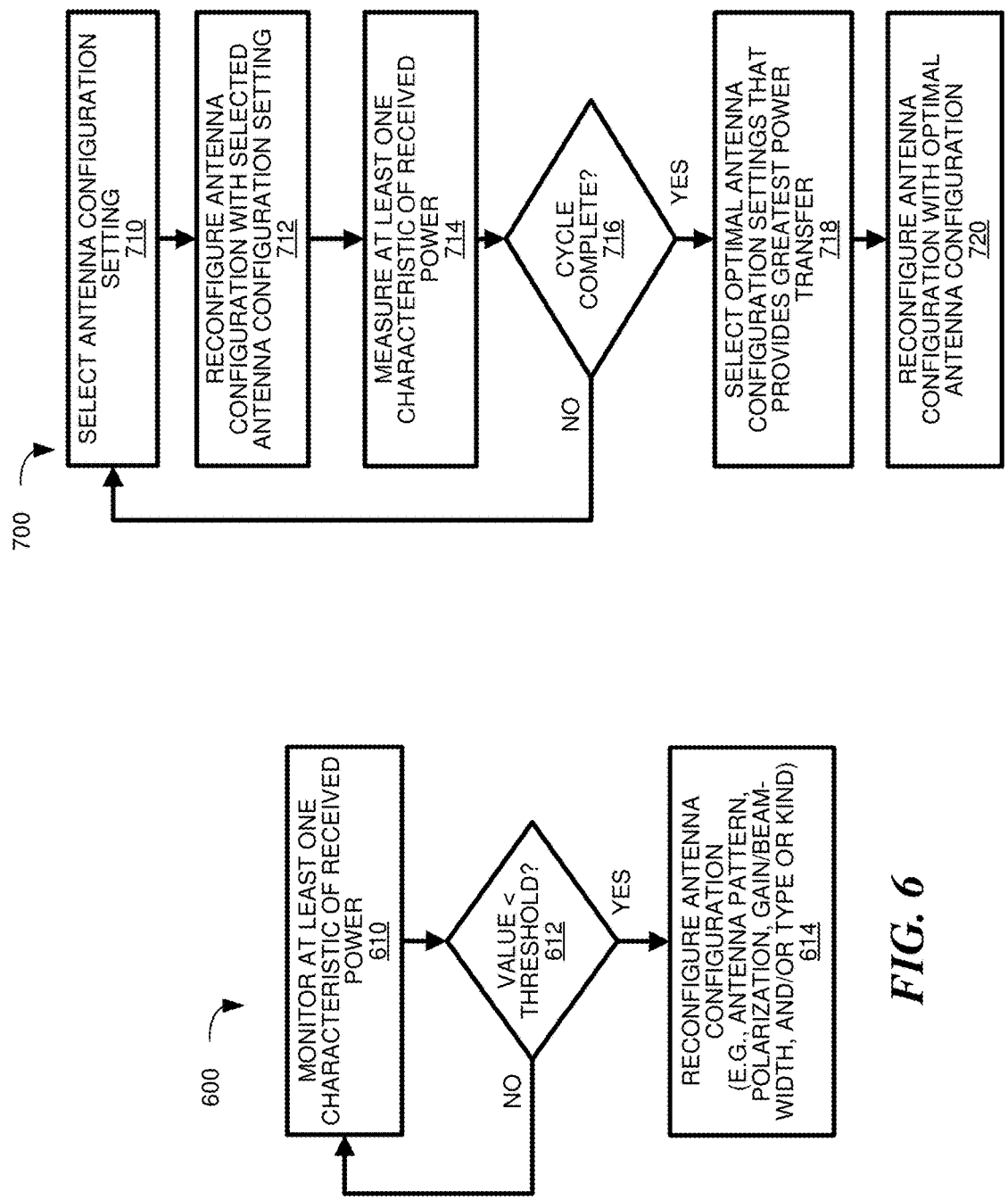
FIG. 6 depicts a flow diagram illustrating an example process for determining whether to reconfigure a radiation and reception pattern ("antenna pattern") of a client antenna (or client antenna array), according to some embodiments.
FIG. 7 depicts a flow diagram illustrating an example process for reconfiguring a wireless power receiver's antenna configuration to improve wireless power transfer, according to some embodiments.

FIG. 6 depicts a flow diagram illustrating an example process for determining whether to reconfigure a radiation and reception pattern ("antenna pattern") of a client antenna (or client antenna array), according to some embodiments. A wireless device and/or a wireless power receiver embedded in the wireless device such as, for example, wireless power receiver client 400 of FIG. 4 can, among other functions, perform the example process 600.

To begin, at step 610 the wireless power receiver monitors at least one characteristic of wireless power received from a wireless power transmission system in a multipath environment after an initial beaconing (or calibration) process. The at least one characteristic can be, among other characteristics, a measure of the received power, one or more signal strength (RSSI) measurements, etc.

At decision step 612, the wireless power receiver determines when the measure of the at least one characteristic fails to meet a preset threshold value, e.g., the received wireless power drops below a preset value or threshold (e.g., 1.5 Watts). At step 614, when the at least characteristic fails to meet the preset threshold, the wireless power receiver dynamically reconfigures its antenna configuration. As discussed herein, reconfiguring the antenna configuration can include one or more of reconfiguring the antenna pattern, the antenna polarization, the gain/beam width and/or the type or kind of one or more antennas of a switchable antenna array. In some embodiments, a second beaconing process can be initiated to ensure that the new configuration is the optimal configuration.

Figure 11A:
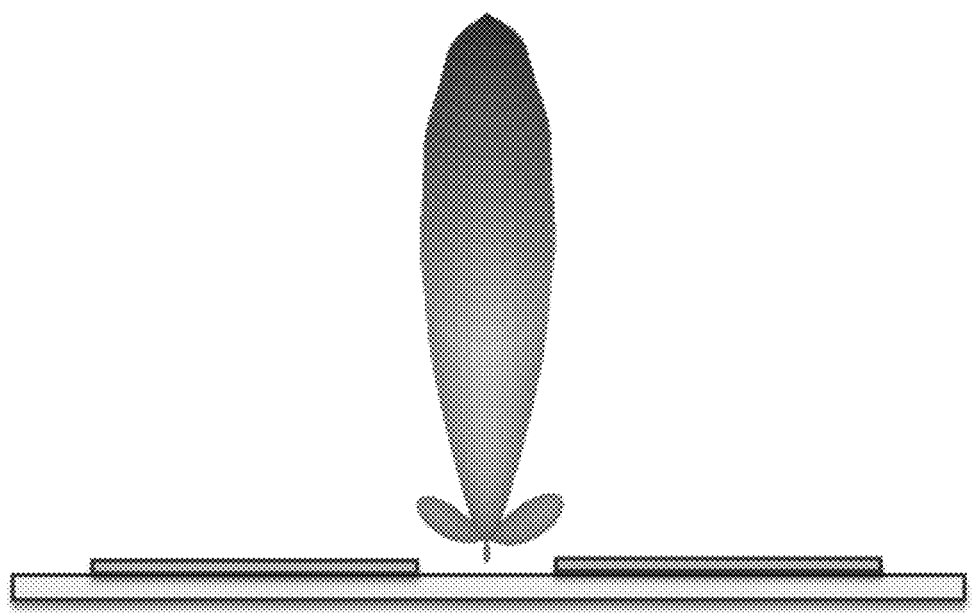
FIGS. 11A and 11B illustrate side views of example beam widths using all four antennas and using only one of the antennas, respectively, according to some embodiments.
Figure 11B:
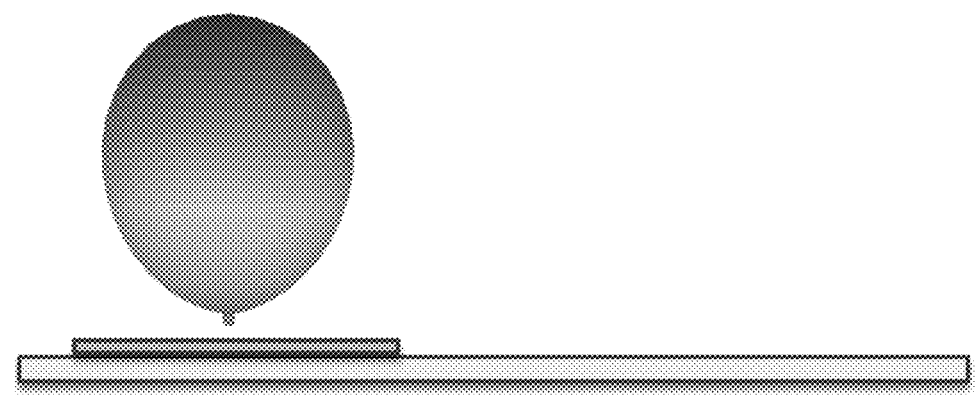
Figure 12:
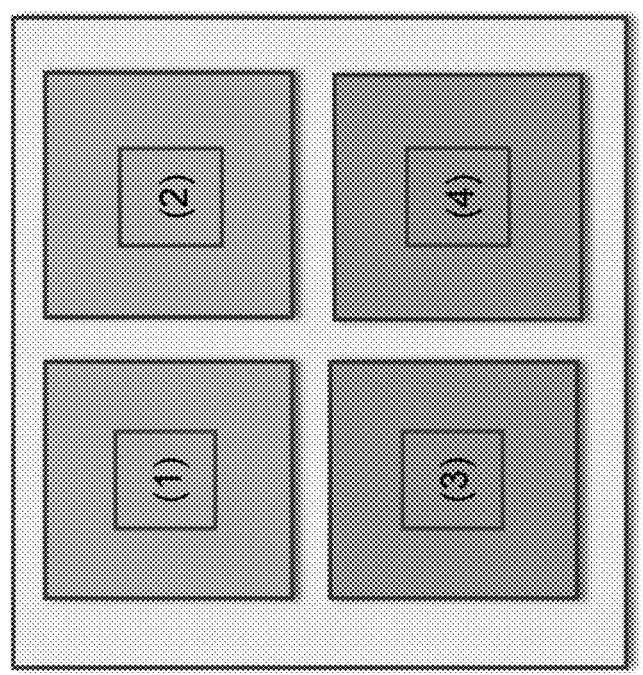
FIG. 12 depicts a block diagram illustrating an example reconfigurable switchable antenna array, according to some embodiments.

FIG. 7 depicts a flow diagram illustrating an example process for reconfiguring a wireless power receiver's antenna configuration to improve wireless power transfer, according to some embodiments. As discussed herein, an optimal antenna configuration is the antenna configuration that provides the most wireless power transfer. The configurations can include one or more of the following, including combinations or variations thereof: pattern configurations (see FIGS. 8A and 8B), polarization configurations (FIG. 9), gain/beam width antenna configurations (FIGS. 10A-11B), and/or various antenna (or array) kind or type configurations (FIG. 12). Other configurations are also possible.

To begin, at step 710 the wireless power receiver selects an antenna configuration setting from multiple preset antenna configuration settings. The wireless power receiver can have any number of configuration settings from which to cycle through when, for example, the received power drops below a threshold. At step 712, the wireless power receiver reconfigures the antenna (or antenna array) configuration based on the selected antenna configuration setting. As discussed herein, the antenna can be configured in any number of ways. By way of example, there can be pattern reconfigurable antenna structures on the antenna when its designed, and switching those, the pattern can be reconfigured. Alternatively, or additionally, the system can have switches and turning them on or off in particular sequences can activate particular patterns. The switches can be, for example, pin diode or MEMS switches that can turn on or off using bias voltages. These types of switches typically shorten or lengthen some designed features on the antenna and, based on where the switches are located, the shape and pattern of the antenna can be dynamically modified.

At step 714, the wireless power receiver measures at least one characteristic of the wireless power receiver with the current antenna configuration. At decision step 716, the wireless power receiver determines if it has cycled through all of the preset antenna configuration settings. If not, the process continues at step 710. Otherwise, at step 718, the wireless power receiver selects an optimal antenna configuration setting that provides the greatest wireless power transfer and, at 720, reconfigures the antenna (or antenna array) configuration based on the optimal antenna configuration setting.

Figure 8A:
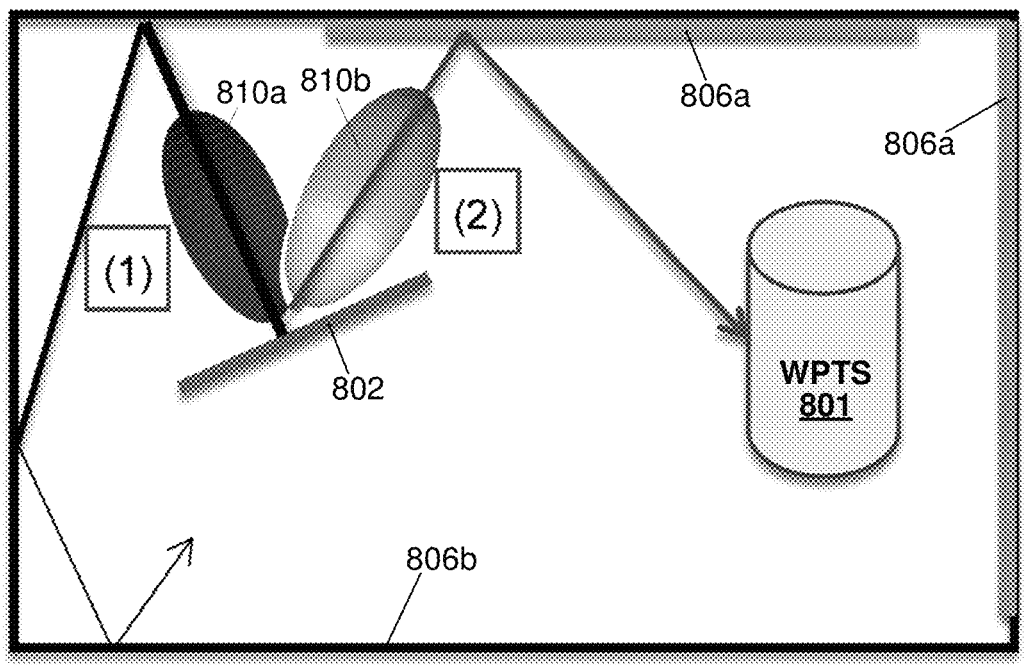
FIGS. 8A and 8B depict diagrams illustrating an example pattern reconfigurable client antenna in a multipath wireless power delivery environment, according to some embodiments.
Figure 8B:
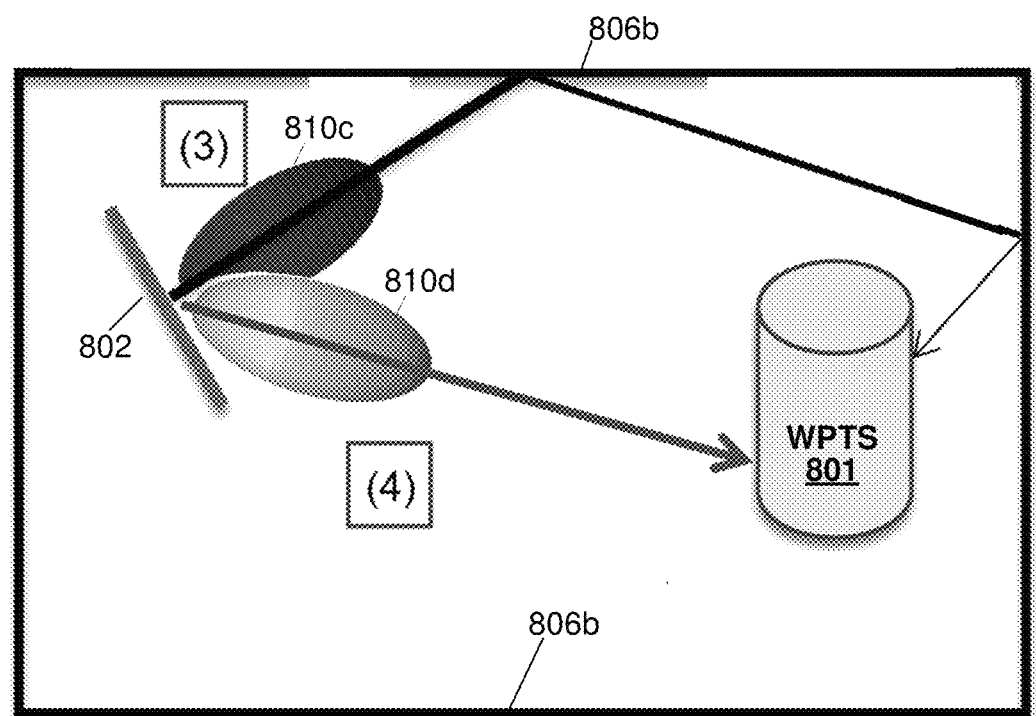

FIGS. 8A and 8B depict diagrams illustrating an example pattern reconfigurable client antenna in a multipath wireless power delivery environment, according to some embodiments. The multipath wireless power delivery environment includes a wireless device 802 having one or more wireless power receiver clients with one or more client antennas and a wireless power transmission system 801. The wireless device and the wireless power receiver clients can be wireless device 102 of FIG. 1 and wireless power receiver client 103 of FIG. 1 or wireless power receiver client 400 of FIG. 4, respectively, although alternative configurations are possible. Likewise, wireless power transmission system can be wireless power transmission system 101 FIG. 1 or wireless power transmission system 300 of FIG. 3, although alternative configurations are possible.

As shown in the examples of FIGS. 8A and 8B, the multipath wireless power delivery environment also includes various reflective objects or surfaces 806a and non- or less reflective surfaces 806b that the system uses for the purposes of multipath. The examples of FIGS. 8A and 8B illustrate various operational scenarios for dynamically reconfiguring and/or otherwise tilting the radiation and reception pattern ("antenna pattern") of a client antenna for improved wireless power transfer. More specifically, in the examples of FIGS. 8A and 8B, the client device beacons and subsequently monitors the amount of power that it receives during a power cycle. If the power drops below a threshold, e.g., 1.5 Watts, then client device can decide to reconfigure the antenna pattern.

Referring first to FIG. 8A, the client antenna pattern 810a is initially oriented in a direction opposite that of the wireless charger 801 (at step 1). The client device beacons and subsequently monitors the amount of power that it receives during a power cycle. More specifically, the antenna pattern is directed toward walls of the multipath wireless power delivery environment which are not completely reflective. The waves or signals emitted during the beaconing process from the antenna pattern lose their strength as they reflect off of the absorptive materials/surfaces. Accordingly, the power received drops below the threshold. Next, (at step 2) the client device reconfigures the antenna pattern 810b toward the reflective material in the room so that the wireless power delivery is improved (via one or more reflective surfaces).

In the example of FIG. 8B, the client antenna pattern 810c is initially oriented in a direction not facing the charger 801 and there are no ideal reflective surfaces to reflect the signals and find a suitably low-loss path to the charger. Like the example of FIG. 8A, the client device beacons and subsequently monitors the amount of power that it receives during a power cycle. Because the paths to the charger are too lossy, the client device determines that the amount of power is insufficient, e.g., less than a threshold value, and (at step 4) the client device reconfigures the antenna pattern 810d such that a direct line of sight path to the charger is established. More specifically, the client device tilts the antenna pattern 810d to employ a direct path to the wireless charger 801. This way the max possible power will be delivered to the client without the need of physically turning/rotating the client by the user. The patterns can be selected and cycled through as discussed in FIG. 7.

Figure 9:
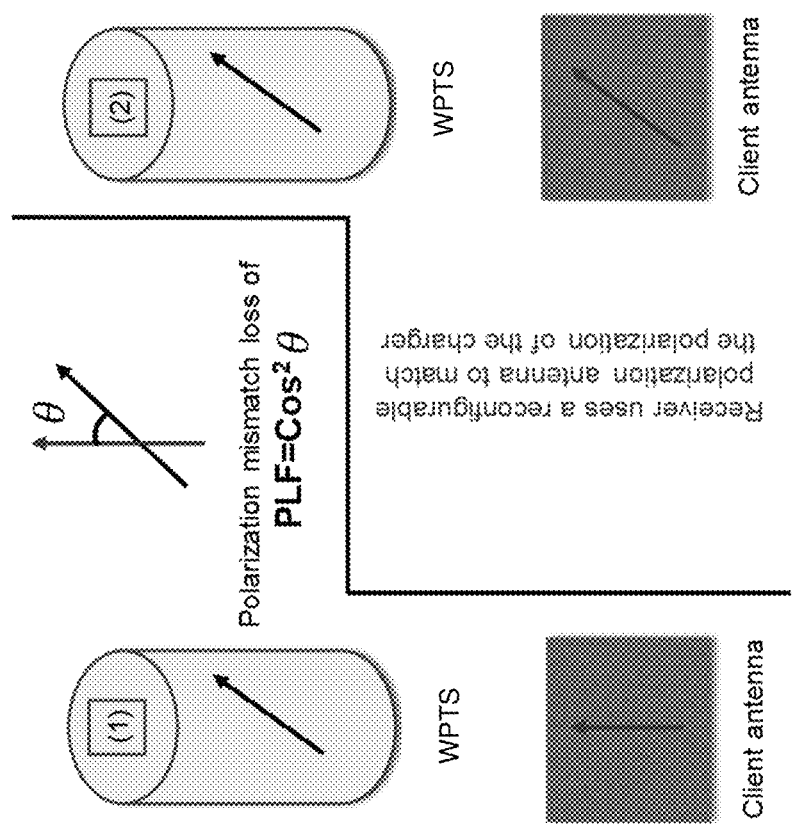
FIG. 9 depict a diagram illustrating an example polarization reconfigurable antenna in a multipath wireless power delivery environment, according to some embodiments.

FIG. 9 depicts a diagram illustrating an example polarization reconfigurable antenna in a multipath wireless power delivery environment, according to some embodiments. More specifically, the example of FIG. 9 illustrates a wireless device or a wireless power receiver client utilizing a reconfigurable polarization antenna to match or attempt to match the polarization of the wireless power transmission system (wireless charger). The wireless power receiver client can be wireless power receiver client 103 of FIG. 1 or wireless power receiver client 400 of FIG. 4, respectively, although alternative configurations are possible. Likewise, wireless power transmission system can be wireless power transmission system 101 FIG. 1 or wireless power transmission system 300 of FIG. 3, although alternative configurations are possible.

Referring to FIG. 9, if a receiver has a polarization that is not absorbing the maximum power from the transmitter due to polarization mismatch, the receiver can reconfigure its polarization so that it matches the radiated wave from the charger (transmitter). The example of FIG. 9 shows two cases: 1) the receiver has a vertical linear polarized antenna and the charger has an inclined linear polarization. As a result, a polarization loss factor (PLF) exists; and 2) the receiver adjusts its polarization to inclined linear in order to match the charger. This way, the received power will be maximized.

By way of example, if a user is holding a phone (wireless device) right in front of the charger (e.g., WPTS), but with a small angle, e.g., the phone is rotated approximately 90 degrees, then the pattern is okay but there is a polarization loss factor which is based on the difference between the two linear polarizations. Assuming that the receiver and the transmitter have vertical polarizations, and the receiver also has a vertical polarization.

In some embodiments, a receiver might have more than one polarization, but a single polarization may be implemented to reduce the size/complexity of the system, etc. So if the transmitter and the receiver have vertical polarizations and the device is held or placed with a 45-degree rotation relative to the transmitter. In this case, wireless power is still transferred to the device (receiver), but a portion of the power is lost due to the 45-degree difference between the polarizations.

Accordingly, the antenna on the receiver can detect, for example, that the received power is below a preset level or threshold and attempt to tilt the polarization to improve wireless power transfer. By way of example, in some embodiments, the tilt can be adjusted using the switches on the receiver. The polarization can be tilted to various fixed settings until a threshold power is received. Alternatively, the polarization can be tilted by cycling through each of multiple fixed settings. Once the cycle is complete, the setting that provides the highest wireless power transfer is selected.

Although the example of FIG. 9 describes two systems with linear polarity, it is appreciated that various other polarities could also be utilized. For example, the polarizations could be linear, elliptical, left-handed, right-handed, circular, etc., and system can switch between them as necessary to improve wireless power transfer.

In another example of operation, the transmitter and the receiver could have a right-handed circular polarization. In this example, assume the wireless device, e.g., phone, is oriented such that it receives reflections which cause the polarization to flip to left-handed. In such cases, the receiver would not receive any wireless power. However, the techniques discussed herein facilitate switching the polarization at the receiver back to left-handed so that power can again be received. For example, the system can cycle through various polarizations measuring the power for each configuration (as discussed in greater detail in the algorithm of FIG. 7) to identify, select and configure the receiver with the polarization that results in optimal wireless power transfer.

Figure 10A:
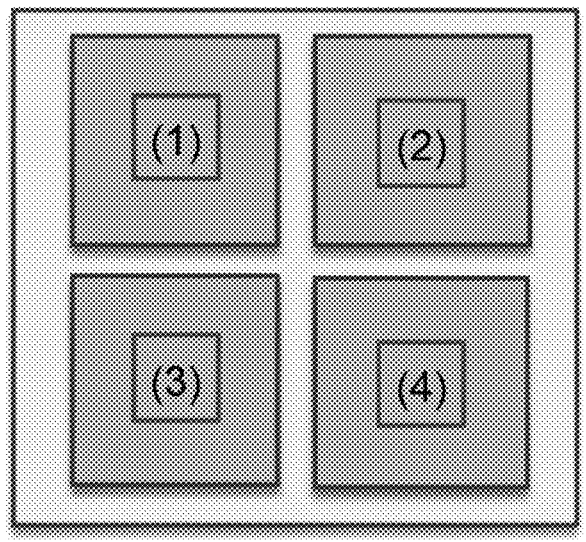
FIGS. 10A and 10B depict block diagrams illustrating an example reconfigurable gain/beam-width switchable antenna array, according to some embodiments.
Figure 10B:
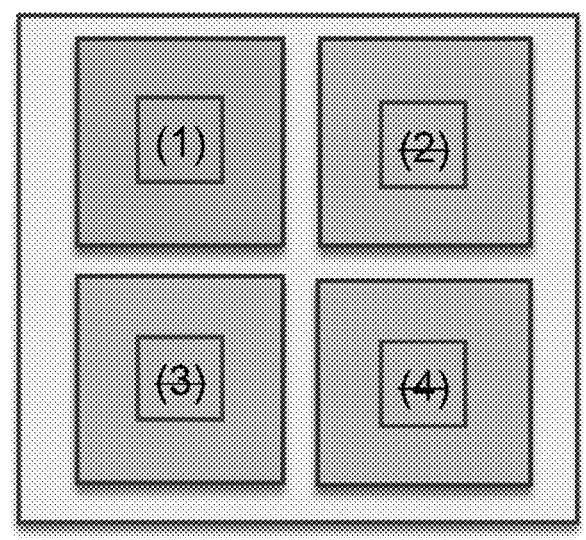

FIGS. 10A-10B depict block diagrams illustrating an example reconfigurable gain/beam-width switchable antenna array, according to some embodiments. More specifically, the example of FIGS. 10A-10B illustrate a reconfigurable antenna array having four antennas with dynamically adjustable beam-width. A wireless device or a wireless power receiver client can utilize a reconfigurable gain/beam-width switchable antenna array. The wireless power receiver client can be wireless power receiver client 103 of FIG. 1 or wireless power receiver client 400 of FIG. 4, respectively, although alternative configurations are possible. Likewise, wireless power transmission system can be wireless power transmission system 101 of FIG. 1 or wireless power transmission system 300 of FIG. 3, although alternative configurations are possible.

By using multiple antennas on the client, the gain of the client antenna will be higher meaning the client receives higher levels of power at the same distance or can receive same levels of power at further distances. Higher gain for the client antenna also means longer range. However, having a higher gain also means that the coverage width of the beam of the client will be decreased. The techniques described herein take advantage of multi-antennas and to dynamically adjust for improved reception wherein necessary, e.g., avoid lower reception in certain angles, etc.

By way of example, assume the client tries to receive power using the connected four antennas. If the power is lower than a certain predefined level, then the client controller will turn off three of the antennas and turn on one single antenna to have a wider beam width in order to receive a higher level of power. This process is referred to herein as a gain reconfigurable (switchable) antenna system for the client. In order to maximize the received power in all conditions, this is necessary. High gain and a narrow beam might be useful for a LINE OF SIGHT (LOS) situation, but for a multi path it might not work in the favor of high power reception. A wider beam-width means the antenna can see all the possible paths through reflective surfaces.

In some embodiments, the client controller will cycle through various gain configurations to determine which gain (beam-width) configuration provides the most wireless power transfer. For example, FIG. 10B depicts antenna 1 activated and antennas 2, 3 and 4 deactivated to create a wider beam width. FIGS. 11A and 11B illustrate side views of example beam widths using all four antennas and using only one of the antennas, respectively. As shown, using a fewer (e.g., a single antenna) achieves a wider beam width and lower gain.

FIG. 12 depicts a block diagram illustrating an example reconfigurable switchable antenna array, according to some embodiments. More specifically, the example of FIG. 12 illustrates a dynamically reconfigurable antenna array having the ability to switch between different antennas in order to achieve various different receiving patterns. A wireless device or a wireless power receiver client can utilize a reconfigurable gain/beam-width switchable antenna array. The wireless power receiver client can be wireless power receiver client 103 of FIG. 1 or wireless power receiver client 400 of FIG. 4, respectively, although alternative configurations are possible. Likewise, wireless power transmission system can be wireless power transmission system 101 FIG. 1 or wireless power transmission system 300 of FIG. 3, although alternative configurations are possible.

As discussed above, different antennas can be used on the client in order to achieve different receiving patterns. For example, antennas 1 and 2 of FIG. 12 can be omnidirectional antennas whereas antennas 3 and 4 can be directional antennas with higher gain. This means that, based on the conditions and the environment, the client (client controller) can choose between different antennas or alternatively cycle between different configurations to identify and/or otherwise determine the configuration that provides optimum wireless power transfer based on the current orientation of the wireless device.

As shown in the example of FIG. 12, antennas 1 and 2 are two-sided antennas with lower gain. Consequently, if the power is coming from a direction that the client's front side cannot capture, the client will choose the omnidirectional (two-sided) antennas in order to receive power from the back. Of course the gain of the two-sided antennas is lower in comparison to directional antennas, but if the power received drops below a threshold receiving the device can determine which configuration proved the maximum wireless power transfer. If the client is facing the transmitter, then the one-sided directional antennas (3, and 4) will be used to have a higher gain. In some embodiments, the antennas operate in pairs so that the gain of each pair is also controllable, i.e. the situation of item #3.

Example Systems

Figure 13:
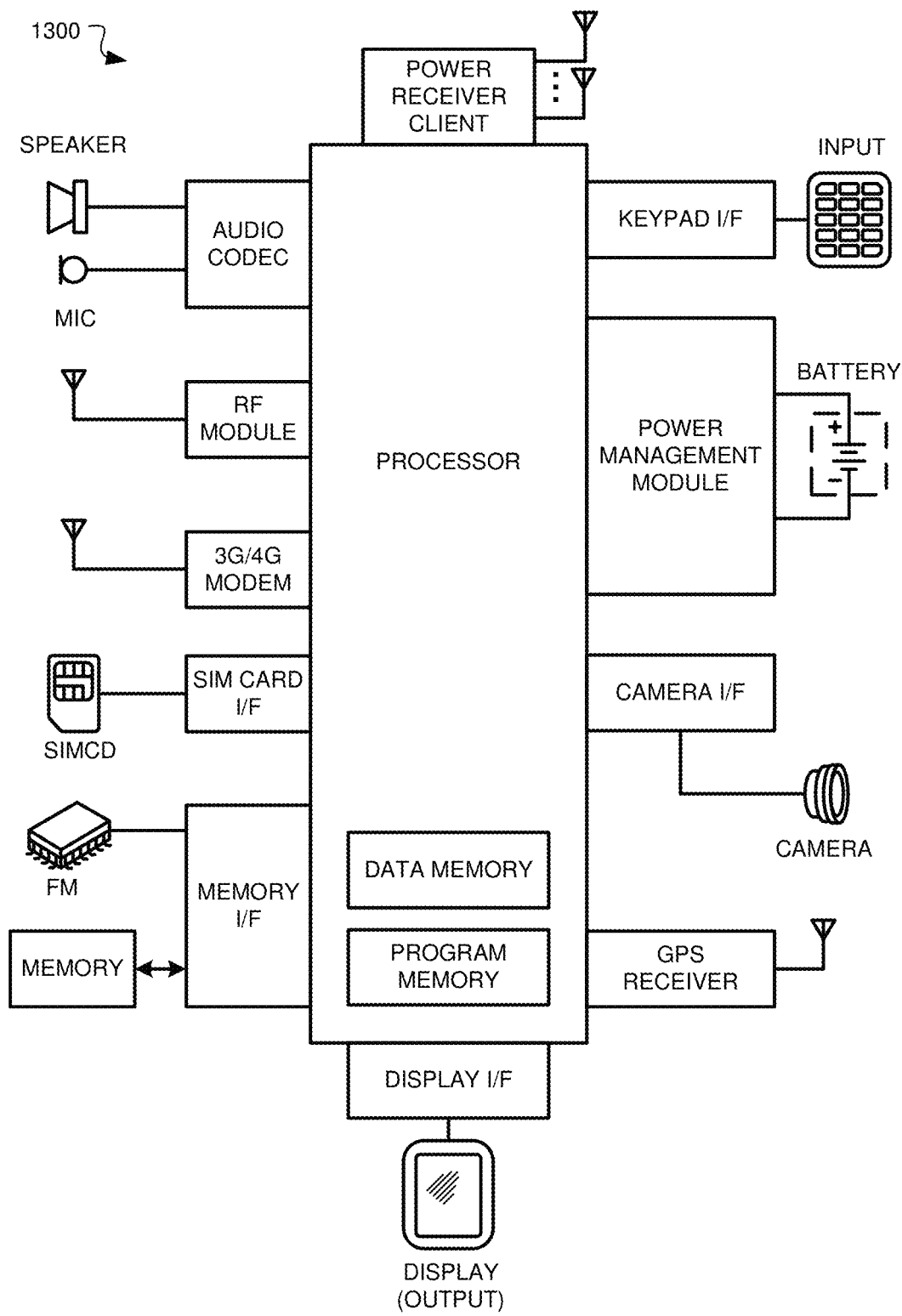
FIG. 13 depicts a block diagram illustrating example components of a representative mobile device or tablet computer with one or more wireless power receiver clients in the form of a mobile (or smart) phone or tablet computer device in accordance with some embodiments.

FIG. 13 depicts a block diagram illustrating example components of a representative mobile device or tablet computer 1300 with a wireless power receiver or client in the form of a mobile (or smart) phone or tablet computer device, according to an embodiment. Various interfaces and modules are shown with reference to FIG. 13, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver client 103 of FIG. 1, although alternative configurations are possible. Additionally, the wireless power receiver client can include one or more RF antennas for reception of power and/or data signals from a power transmission system, e.g., wireless power transmission system 101 of FIG. 1.

Figure 14:
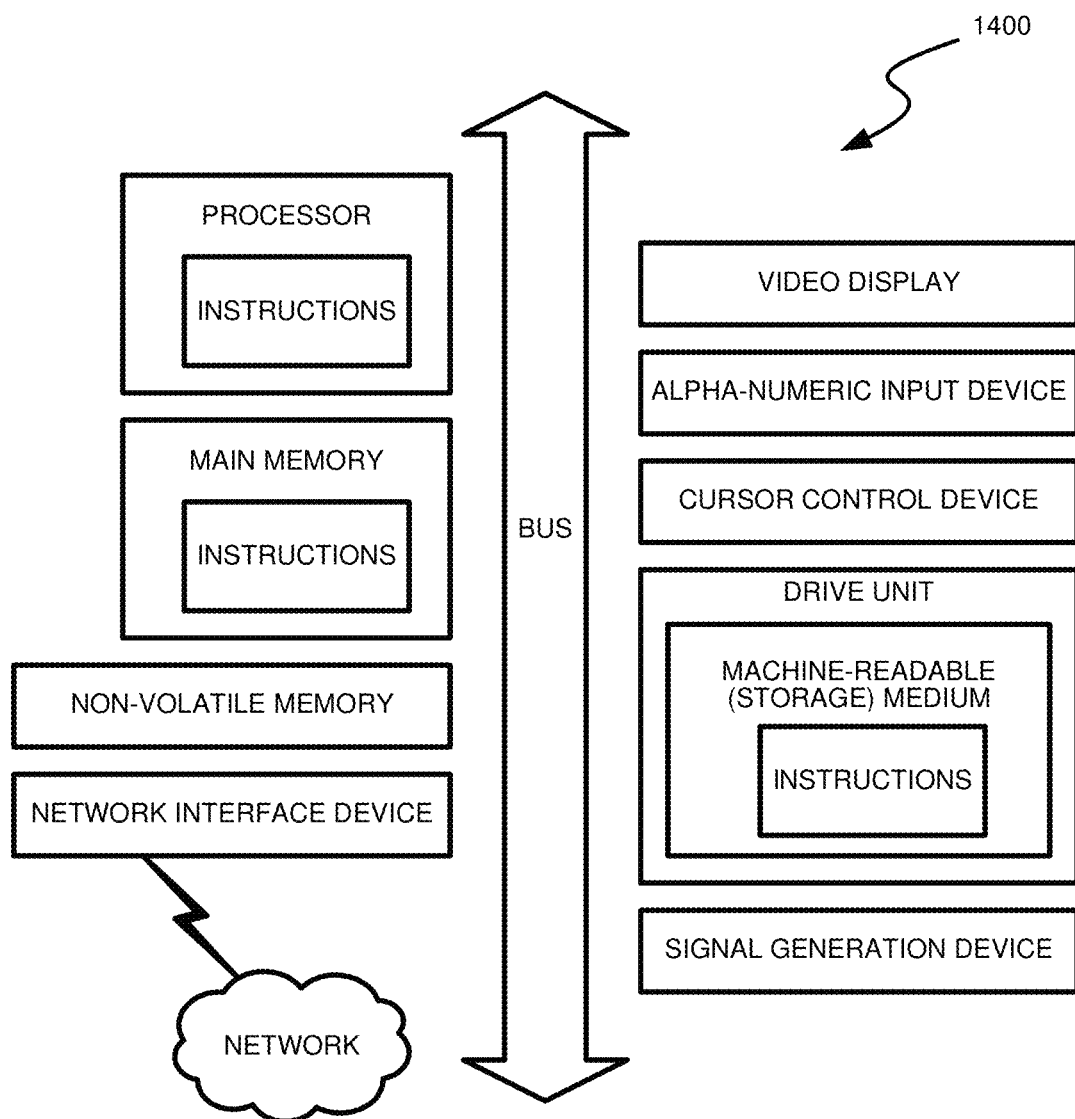
FIG. 14 depicts a diagrammatic representation of a machine, in the example form, of a computer system within which a set of instructions, for causing the machine to perform any one or more of the methodologies discussed herein, may be executed.

FIG. 14 depicts a diagrammatic representation of a machine, in the example form, of a computer system within which a set of instructions, for causing the machine to perform any one or more of the methodologies discussed herein, may be executed.

In the example of FIG. 14, the computer system includes a processor, memory, non-volatile memory, and an interface device. Various common components (e.g., cache memory) are omitted for illustrative simplicity. The computer system 1400 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 14 reside in the interface.

In operation, the computer system 1400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, 16, other aspects may likewise be embodied as a means-plus-function claim, or in other forms, such as being embodied in a computer-readable medium. (Any claims intended to be treated under 35 U.S.C. § 112, 16 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A wireless power receiver comprising:
   means for receiving wireless power from a wireless power transmission system (WPTS), the means for receiving wireless power having a plurality of configuration settings; and
   circuitry coupled to the means for receiving wireless power, and configured to:
      measure at least one characteristic of the received wireless power;
      determine that the at least one characteristic fails to meet a preset threshold; and
      in response to determining that the at least one characteristic fails to meet the preset threshold, reconfigure the means for receiving wireless power by cycling through two or more of the plurality of configuration settings to identify one of the two or more configuration settings that provides the wireless power receiver a maximum wireless power transfer from the WPTS.

2. The wireless power receiver of claim 1, wherein each of the plurality of configuration settings modifies one or more attributes of the means for receiving wireless power.

3. The wireless power receiver of claim 2, wherein the one or more attributes include at least one of: a radiation pattern, a polarization, a gain width, and a beam width.

4. The wireless power receiver of claim 2, wherein the circuitry is further configured to iteratively reconfigure the means for receiving wireless power according to each of the two or more configuration settings.

5. The wireless power receiver of claim 4, wherein the circuitry is further configured to iteratively measure the at least one characteristic for the each of the two or more configuration settings.

6. The wireless power receiver of claim 5, wherein the circuitry is further configured to compare each iterative measure of the at least one characteristic to further facilitate identification of the one of the two or more configuration settings.

7. The wireless power receiver of claim 6, wherein the circuitry is further configured to reconfigure the means for receiving wireless power according to the one of the two or more configuration settings.

8. The wireless power receiver of claim 1, wherein the means for receiving wireless power includes at least one radio frequency (RF) antenna.

9. The wireless power receiver of claim 8, wherein the at least one RF antenna includes a switchable antenna array.

10. The wireless power receiver of claim 8, wherein the at least one RF antenna includes a plurality of RF antennas.

11. The wireless power receiver of claim 1, wherein the plurality of configuration settings adjust a type of the means for receiving wireless power.

12. The wireless power receiver of claim 1, wherein the at least one characteristic includes a measure of power received by the means for receiving wireless power from the WPTS.

13. The wireless power receiver of claim 1, wherein the at least one characteristic includes a signal strength measurement of the received wireless power.

14. A method of operating a wireless power receiver, the method comprising:
measuring at least one characteristic of wireless power received, from a wireless power transmission system (WPTS), by a receiving means having a plurality of configuration settings;
determining that the at least one characteristic fails to meet a preset threshold; and
reconfiguring the receiving means in response to determining that the at least one characteristic fails to meet the preset threshold, wherein the reconfiguring comprises cycling through two or more of the plurality of configuration settings to identify one of the two or more configuration settings that provides the receiving means a maximum wireless power transfer from the WPTS.

15. The method of claim 14, wherein each of the plurality of configuration settings modifies one or more attributes of the receiving means.

16. The method of claim 15 further comprising iteratively reconfiguring the receiving means according to each of the two or more configuration settings.

17. The method of claim 16 further comprising iteratively measuring the at least one characteristic for the each of the two or more configuration settings.

18. The method of claim 17 further comprising comparing each iterative measure of the at least one characteristic to further facilitate identifying the one of the two or more configuration settings.

19. The method of claim 18 further comprising reconfiguring the receiving means according to the one of the two or more configuration settings.

20. One or more non-transitory computer readable media having stored thereon program instructions which, when executed by a processing system of a machine, cause the machine to:
measure at least one characteristic of wireless power received, from a wireless power transmission system (WPTS), by a receiving means having a plurality of configuration settings;
determine that the at least one characteristic fails to meet a preset threshold; and
reconfigure the receiving means in response to determining that the at least one characteristic fails to meet the preset threshold by cycling through two or more of the plurality of configuration settings to identify one of the two or more configuration settings that provides the receiving means a maximum wireless power transfer from the WPTS.

* * * * *